United States Patent
Richardson et al.

(10) Patent No.: US 9,499,662 B2
(45) Date of Patent: Nov. 22, 2016

(54) FOAM CONTROL COMPOSITIONS

(75) Inventors: John Richardson, Hanover, VA (US); Mark Puchovich, Henrico, VA (US); Vladimir Djukanovic, Henrico, VA (US); Karen Williams, Richmond, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 373 days.

(21) Appl. No.: 13/079,804

(22) Filed: Apr. 4, 2011

(65) Prior Publication Data

US 2011/0240914 A1  Oct. 6, 2011

Related U.S. Application Data

(60) Provisional application No. 61/320,492, filed on Apr. 2, 2010.

(51) Int. Cl.
| | |
|---|---|
| *B01D 19/04* | (2006.01) |
| *C08G 65/26* | (2006.01) |
| *C08L 71/02* | (2006.01) |

(52) U.S. Cl.
  CPC ............ *C08G 65/2624* (2013.01); *B01D 19/04* (2013.01); *B01D 19/0413* (2013.01); *C08L 71/02* (2013.01)

(58) Field of Classification Search
  CPC ................. B01D 19/0413; B01D 19/04; C08L 71/02; C08G 65/2624
  USPC ....................................................... 516/129
  See application file for complete search history.

(56) References Cited

U.S. PATENT DOCUMENTS

| | | | | |
|---|---|---|---|---|
| 4,092,170 | A | * | 5/1978 | Houtermans et al. ......... 430/175 |
| 4,743,395 | A | * | 5/1988 | Leifheit ......................... 510/384 |
| 5,409,574 | A | * | 4/1995 | Razac et al. ................... 162/156 |
| 5,885,932 | A | * | 3/1999 | Parr ........................ A01N 25/30 504/116.1 |
| 6,387,872 | B1 | * | 5/2002 | Bolzoni ......................... 510/499 |
| 6,479,446 | B1 | * | 11/2002 | Sherry et al. .................. 510/238 |
| 7,030,060 | B1 | * | 4/2006 | McDonald ............. A01N 33/12 504/116.1 |
| 2003/0045440 | A1 | * | 3/2003 | Van der Hoeven ....... C11D 3/06 510/267 |
| 2003/0069135 | A1 | * | 4/2003 | Kober et al. ................ 504/116.1 |
| 2005/0032668 | A1 | * | 2/2005 | Pedersen et al. .............. 510/499 |
| 2008/0227679 | A1 | * | 9/2008 | Mangnus et al. .............. 510/238 |

FOREIGN PATENT DOCUMENTS

| | | | |
|---|---|---|---|
| GB | 1 443 244 | * | 7/1976 |
| GB | 2 117 013 A | * | 10/1983 |

OTHER PUBLICATIONS

Kirk Othmer Encyclopedia of Chemical Technology, "Carboxylic Acids, Manufacture", R. W. Johnson and R. W. Daniels, Union Camp Corporation, © 1993 by John Wiley & Sons, Inc. (Article Online Date: Dec. 4, 2000), pp. 1-2 obtained Online @ http://m rw.interscience.wiley.com/emrw/9780471238966/search/firstpage (downloaded Jun. 19, 2010).*

* cited by examiner

*Primary Examiner* — Daniel S Metzmaier
(74) *Attorney, Agent, or Firm* — Oliff PLC

(57) ABSTRACT

Disclosed is a method for inhibiting the formation of foam in aqueous systems by adding foam control composition including a polyoxyethylene and/or a polyoxypropylene nonionic fatty acid derivative and a quaternary ammonium surfactant.

11 Claims, No Drawings

FOAM CONTROL COMPOSITIONS

PRIORITY STATEMENT

This application claims priority from U.S. Provisional Patent Appl. No. 61/320,492, which was filed on Apr. 2, 2010, the entire contents of which are hereby incorporated by reference.

FIELD OF THE INVENTION

The present invention relates to foam control compositions and the preparation and use of such foam control compositions, particularly in conjunction with aqueous systems. The inventive foam control additive compositions are not oil-based or silicone-based and, consequently, are more easily removed from solid surfaces. These foam control additives are particularly useful in applications including, for example, food processing, mining, pulp and paper and water purification, in which improved removal of the foam control additive(s) is advantageous. Improved foam control additive removal can reduce process complexity, improve process performance and/or improve the properties of the finished product by avoiding or reducing, for example, adverse effects in one or more properties of the finished product, reduced efficiency of heat transfer surfaces within the process and/or impacts drainage retention properties of intermediate or finished products.

BACKGROUND OF THE INVENTION

Although, as well known to those skilled in the art, there is a diverse set of chemical formulations that can be used to prevent or suppress the formation of a foam (an anti-foam composition) and/or to eliminate or reduce a volume of foam after foam formation (a defoamer composition), in practice, the terms are used somewhat interchangeably. This may be due, in part, to the fact that most foam treating formulations exhibit some degree of both anti-foam and defoaming properties. For the purpose of this disclosure, therefore, the term foam control composition will be used to encompass those compositions and formulations that exhibit anti-foam and/or defoaming activity. A general characteristic of most foam control compositions is the combination of surface activity and being highly insoluble in aqueous solutions. Many foam control compositions are formulated as an emulsion that, in combination with its surface-active nature results in rapid spreading onto any air-water interface that it encounters. Some defoamers include particles including, for example, hydrophobized silica particles or ethylene-bis-stearamide particles, that pierce the surfaces of foam bubbles and cause the smaller bubbles to coalesce or agglomerate as the defoamer spreads along the interface.

Although many earlier conventional foam control compositions utilized one or more oils as the main ingredient, there are increasing concerns about chlorinated organic products resulting from, for example, chlorine bleaching of the residual organic components during subsequent processing. This was of particular concern within the pulp and paper making industries and has led to increased use of reduced or low-oil compositions and/or oil-free compositions using, for example, silicone-based compositions that generate less cause for concern during downstream processing.

The persistence of foam in various industrial processes can cause process inefficiencies and, in some cases, degrade one or more properties of the final product. For example, when treating produced water from steam assisted gravity drainage systems, foam control compositions are often used to prevent or suppress foam formation in the evaporators being used to reclaim the produced water. Although silicone-based foam control compositions are generally effective in suppressing foam formation, silicone-based can tend to form films on heat transfer surfaces within the equipment. These films can, in turn, produce undesirable effects including, for example, impeding heat transfer into the process fluid and/or acting as a point of adhesion for other deposit forming substances.

As the name implies, oil-based foam control compositions utilize an oil carrier including, for example, one or more oils selected from a group including mineral oils, vegetable oils, white oils and/or any other oil that is generally insoluble in the foaming medium. Oil-based foam control compositions may also incorporate one or more waxes and/or particulates, for example, hydrophobic silica, in order to improve the performance. Waxes typically used in such applications include, for example, ethylene bis stearamide (EBS), paraffinic waxes, ester waxes and fatty alcohol waxes. These oil-based foam control compositions may also include one or more surfactants in order to improve emulsification and spreading within the foaming medium.

Water-based foam control compositions include different types of oils, often white oils or vegetable oils and waxes, often one or more long chain fatty alcohols, fatty acid soaps or esters, dispersed in a water base.

As the name implies, silicone-based foam control compositions utilize one or more a silicone compounds as the active component. These might be delivered as an oil or a water-based emulsion. The silicone compound frequently consists of hydrophobic silica particles dispersed in a silicone oil. A range of emulsifiers can be utilized to improve the ability of the silicone compound(s) to spread easily and quickly throughout the foaming medium. The silicone-based foam control compositions may also contain silicone glycols and other modified silicone fluids. Silicone based foam control compositions may also be utilized for suppressing foams in non-aqueous foaming systems experienced in certain industries including, for example, the production of crude oil and associated oil refining operations. For very challenging applications, fluorosilicones may provide improved performance.

EO/PO based foam control compositions contain polyethylene glycol and polypropylene glycol copolymers and are typically delivered as oils, aqueous solutions, or water-based emulsions. EO/PO copolymers normally have good dispersing properties and may be preferred in those applications in which surface deposit problems are an issue. Additional background information on the history, formulation and use of foam control compositions may be found in editor Garret, P. R.'s *Defoaming: Theory and Industrial Applications* (1992), Surfactant Science Series 45 CRC Press ISBN 0-8247-8770-6, the entire contents of which are incorporated herein by reference.

DESCRIPTION OF RELATED ART

Nguyen's U.S. Pat. No. 5,460,698, describes a range of FOAM CONTROL COMPOSITIONs comprising a combination of a) polyoxyethylene (EO)-polyoxypropylene (PO) fatty alcohol and/or polyoxyethylene (EO)-polyoxypropylene (PO) di-fatty acid having a melting point lower than 20° C. and b) oleic diethanolamide. According to Nguyen, these compositions can be formulated at room temperature to produce a defoaming mixture that exhibits improved effectiveness in reducing and controlling both surface foam and entrained air than the individual components or other conventional defoamers. Nguyen also indicated that the defoaming effects attributed to the compositions are more evident at lower temperatures, especially systems operating in the 20° C.-55° C. range such as de-inked recycled tissue effluent treatment and acid/alkaline fine paper systems. nguyen describes an antifoam composition for aqueous systems consisting of a poloxyetheleyne difatty acid which has the benefit that it does not interfere with the paper making process. Ngygen focuses on the importance of the difatty acid structure as a molecular defoamer.

Galgoci, E. C., et al.'s, *Innovative Molecular Defoamer Technology*, Air Products and Chemicals, Inc., Pub. No. 120-05-017-GLB (2004), the entire contents of which are incorporated herein by reference, describe molecular defoamers (MDs) as a new approach to defoaming. Unlike conventional FOAM CONTROL COMPOSITIONs, which typically utilize macroscopic physical incompatibility to destabilize foam, MDs break foam on a molecular level by adsorbing at the liquid/gas interface of foam bubbles thereby displacing some of the foam-stabilizing surfactants with surfactants (molecular defoamers) that behave antagonistically. Additional discussion on this point may be found in, for example, Rosen, M. J.'s *Surfactants and Interfacial Phenomenon*, $2^{nd}$ edition, John Wiley and Sons, New York (1989), the entire contents of which are incorporated herein by reference, at, for example, pages 278-282.

Deck et al.'s U.S. Pat. No. 5,114,607, the entire contents of which are incorporated herein by reference, describes the use of EO-PO block copolymers to produce a low foaming cleaner. In particular, disclosed compositions include 1) a low foaming ethylene oxide-propylene oxide (EO-PO) block copolymer surfactant and 2) a defoaming reverse EO-PO block copolymer surfactant in a cleaner composition further comprising an alkali metal hydroxide, an alkali metal salt of gluconic acid and, preferably, an alkali metal tripolyphosphate. According to Deck, both surfactants effectively wet a metal surface being cleaned with the water soluble surfactant providing detergency and the oil soluble surfactant providing a defoaming action and aiding in separating the oil during waste fluid treatment. Deck's compositions could be provided as a powder or an aqueous suspension, the aqueous solution including a hydrotrope for maintaining the suspension. The method and composition of the present invention provides for effective cleaning of metal surfaces even under heavy oil conditions due to the presence of the low foaming EO-PO block copolymer surfactant. The cleaning bath is resistant to foaming due to the presence of the defoaming reverse EO-PO block copolymer surfactant. In addition, the defoaming reverse EO-PO surfactant simplifies separation of the waste oils from the aqueous treatment solution during effluent treatment.

Razac, et al.'s U.S. Pat. No. 5,409,574, the entire contents of which are incorporated herein by reference, discloses the use of a small amount of propoxylated fatty amine ethoxylates to produce a low foaming dispersion in glass fiber manufacture. Anchor et al.'s U.S. Pat. No. 5,605,949, the entire contents of which are incorporated herein by reference, describes the use of a specific alcohol ethoxylate surfactant to create an improved latex composition which resists foaming. An example of the preferred surfactant was described as a normally liquid predominantly hydrophobic nonionic alcohol ethoxylate surfactant having a molecular weight of approximately 330 formed by the reaction of primarily branched-chain decyl alcohol molecules having 10 carbon atoms per molecule with 4 moles of ethylene oxide. This ethoxylate surfactant was then combined with a hydrocarbon-based mineral oil defoaming agent having a boiling point of approximately 695° to 840° F. and incorporated into the low-foaming latex composition.

BRIEF SUMMARY

The present invention provides foam control compositions comprising a combination of polyoxyethylene (EO) and/or polyxoypropylene (PO) of a non-ionic fatty acid derivative such as ethoxylated oleyl amine and a quaternary surfactant compound such as alkyl dimethyl benzyl ammonium chloride (ADBAC). The compositions can be formulated as aqueous solutions and provide a combination of effective foam control with beneficial defoaming properties including, for example, reduced residual levels of the foam control composition(s) in the finished products or on other wetted surfaces in the process equipment when compared to conventional foam control technology.

DETAILED DESCRIPTION

In accordance with the present invention the antifoam properties of an EO or PO non-ionic fatty acid derivatives are enhanced by combining them with a quaternary ammonium surfactant. Because quaternary ammonium surfactants are generally regarded as foam-generating compounds, the incorporation of such surfactants in combination with polyoxyethylene-polyoxyproplyene nonionic fatty acid derivatives to produce a successful foam control composition was contrary to the conventional wisdom in the art of foam control compositions.

The preferred polyoxyethylene-polyoxyproplyene nonionic fatty acid derivatives are those having hydrophile-lipophile (HLB) values of at least 10, preferably at least 12, and more preferably at least 16, indicating a strong affinity for water. One such ethoxylated fatty acid derivative is POE(30) oleyl amine liquid with an HLB of 16.6 and an amine NE of 1910. A preferred quaternary ammonium surfactant is alkyl dimethyl benzyl ammonium chloride. The quaternary function can be expressed by formula [1]

$$R^1-N-R^2CH_3CH_3 \qquad [1]$$

wherein $R^1=C_6H_6$ and $R^2=C_nH_{(2n+1)}$ where n=8-18.

The weight ratio range of the EO/PO derivative to the quaternary compound within the foam control composition is generally from 2:1 to 30:1 with a preferred ratio being in the range from 5:1 to 10:1. The foam control compositions according to the invention may be formulated in aqueous solution and may be provided at superbatch concentrations that are water dilutable and can be made down (diluted) with water on site to achieve the desired concentration of actives and/or to avoid overfeeding. The foam control compositions formulated according to the invention can be added to aqueous systems, including concentrated brines, in an amount to produce final concentrations of the foam control composition from about 1 ppm to 5000 ppm by weight. An example foam control composition according to the invention may comprise 50% ethoxylated amine and 5% ADBAC quat and 45% water by weight.

Examples

In the following examples foaming, residual antifoam and drainage retention tests were conducted with a clay containing micronutrients as described in U.S. Pub. Pat. Appl. No. 2007/0119222, the entire contents of which are incorporated herein, by reference. This substance was chosen because it generally represents an insoluble material that is susceptible to foam generation when agitated in aqueous solution. The test material allows the opportunity to study foam reduction, adsorption of antifoam on solid surfaces and drainage retention of clay exposed to aqueous solutions of antifoam.

In the following examples the oil-based defoamer utilized was FO420 (commercially available from Chemtreat, Inc. Richmond, Va.) and the silicon-based defoamer utilized was FO220 (commercially available from Chemtreat, Inc. Richmond, Va.).

Foam Height Reduction

Foam height was measured by weighing 3 grams of micronutrient clay into a 250 ml stoppered measuring cylinder. 100 ml of water was added to the cylinder and a measured amount of antifoam agent was added to this mixture. The solution is then manually shaken for 30 seconds to develop a foam head. The height of the foam head is measured in inches using a scale directly after shaking by placing the cylinder on a flat surface.

Antifoam Testing—Micronutrient Clay

TABLE 1

| Composition | Foam Height (Inches) |
| --- | --- |
| Control | 1.3 |
| Oil-Based Defoamer 50 mg/L | 0.2 |
| Silicon-Based Defoamer 50 mg/L | 0.2 |
| ADBAC Quaternary Surfactant 2 mg/L | 3.0 |
| Ethoxylated Oleylamine/50 mg/L | 0.7 |
| Ethoxylated Oleylamine + ADBAC 50:2 mg/L | 0.3 |

Results show that the oil-based defoamer and silicone-based defoamer are effective in controlling foam in this test. Use of the ADBAC surfactant alone led to increased foam over the control while the ethoxylated fatty amine alone was only moderately successful in controlling the foam. The combination of the ADBAC and the ethoxylated fatty amine, however, was similar to the defoaming efficiency of the conventional defoamers.

Defoamers Residue Testing

It is an intention of this invention that the foam control compositions formulated in accord with this disclosure do not leave significant residue on solid surfaces either minerals, food products, paper products or heat transfer surfaces.

To test this property 5 g of the micronutrient clay used for the antifoam tests was exposed to 1 g of antifoam composition. Conventional antifoams were compared to the foam control compositions according to the invention. Micronutrient clay was dried at 105° C. for 12 hours to obtain a dry weight. 5 g was weighed into each test beaker and 50 ml of deionized water was added to each test. Then 1 g of each antifoam component was added to the respective test beaker and gently stirred for 2 minutes. The solids from each test were filtered onto pre-weighed filter paper and then the solid materials were dried for 24 hours.

Residual %=using absolute values of difference(Control−Sample/Control)×100

Antifoam Residual Testing

TABLE 2

| | Weight | | | |
| Sample | Starting | Final | Difference | Residual (%) |
| --- | --- | --- | --- | --- |
| Control | 5.3107 | 5.1309 | −0.1798 | |
| Oil-Based | 5.3606 | 5.2334 | −0.1272 | 29.2 |
| Silicon-Based | 5.3901 | 5.3765 | −0.0136 | 92.4 |
| Ethoxylated Oleylamine + ADBAC 50:2 mg/L | 5.3626 | 5.2273 | −0.1353 | 4.45 |

Although each of the clay samples lost weight during this test, there were differences in the weight loss attributed to the defoamers used. The clay in the presence of the silicon-based defoamer gained the most with a 92% difference over the control. The composition represented by the invention gained only 4.45% indicating minimal interaction with the clay solids. The data reflects that the foam control composition according to the invention exhibits has less interaction with the clay than either of the conventional antifoams.

Water Retention Testing

Another feature of the invention is that foam control compositions formulated according to the disclosure may improve drainage of solids over conventional antifoams that tend to exhibit stronger interactions with the solids leaving a residue that may impact water retention negatively. In many food, paper and mining processes retention of water is an issue and antifoams that promote water rejection are advantageous and can reduce the cost and complexity of drying equipment or other processing required to remove excess water.

To measure water retention the dry micronutrient clay deposits from the antifoam residual tests shown in TABLE 2 were utilized for further testing. Empty 250 ml glass beakers were pre-weighed. 3 g of each pretreated clay sample from TABLE 2 was weighed and mixed with 50 g of deionized (DI) water in a separate 250 ml beaker. This mixture was then poured through a glass funnel containing a number 40 Whatman filter paper suspended above the pre-weighed flask. The solids stay on the filter paper and the filtrate collects in the pre-weighed flask. The flask and filtrate are re-weighed after 15 minutes was allowed for the liquid to drain from the clay. A control experiment was performed in the same manner without clay to measure the amount of water retained on the filter paper. Results are calculated as follows $A$=Empty Flask $B$=Weight of Water $C$=Flask+Filtrate Water Retention of Clays Previously Exposed to Antifoam Compositions

TABLE 3

| Condition | Empty Flask | Weight Of Filtrate | % Water Retention |
| --- | --- | --- | --- |
| No Clay | 95.2150 | 44.2975 | NA |
| Control Untreated Clay | 95.3841 | 40.2113 | 8.1 |
| Oil Based Defoamer | 94.2610 | 40.5813 | 7.4 |
| Silicone Based Defoamer | 86.5648 | 39.8875 | 8.8 |
| Ethoxylated Oleylamine + ADBAC | 94.8071 | 41.2515 | 6.0 |

The results show that the most water passed through the sample pretreated with the invention composition. The clay treated with the silicone-based anti-foam composition retained the most water—almost 3% more than that retained by the clay treated with a foam control composition according to the present invention.

We claim:

1. A foam control composition comprising:
   a polyoxyethylene-polyoxypropylene non-ionic fatty amine derived from a fatty acid, wherein the polyoxyethylene-polyoxypropylene non-ionic fatty amine derived from a fatty acid includes polyoxyethylene and polyoxypropylene units; and
   a quaternary ammonium surfactant,
   wherein a weight ratio of the polyoxyethylene-polyoxypropylene non-ionic fatty amine derived from a fatty acid to the quaternary ammonium surfactant is from 2:1 to 30:1, and
   wherein the polyoxyethylene-polyoxypropylene non-ionic fatty amine derived from a fatty acid is present in the foam control composition in an amount of 10 wt % to 50 wt %.

2. The foam control composition according to claim 1, wherein:
   the polyoxyethylene-polyoxypropylene non-ionic fatty amine derived from a fatty acid is characterized by a HLB value of at least 10.

3. The foam control composition according to claim 1, wherein:
   the polyoxyethylene-polyoxypropylene non-ionic fatty amine derived from a fatty acid is characterized by a HLB value of at least 16.

4. The foam control composition according to claim 1, wherein:
   the quaternary ammonium surfactant is characterized by a quaternary function represented by the formula $R^1$—N—$R^2CH_3CH_3$ wherein $R^1=C_6H_6$ and $R^2=C_nH_{(2n+1)}$; and further wherein n is an integer from 8 to 18.

5. The foam control composition of claim 1, wherein the weight ratio of the polyoxyethylene-polyoxypropylene non-ionic fatty amine derived from a fatty acid to the quaternary ammonium surfactant is from 5:1 to 10:1.

6. The foam control composition of claim 1, wherein the non-solvent components of the composition consist essentially of the polyoxyethylene-polyoxypropylene non-ionic fatty amine derived from a fatty acid, and the quaternary ammonium surfactant.

7. The foam control composition of claim 1, wherein the quaternary ammonium surfactant is present in the foam control composition in an amount of from 1.67 wt % to 25 wt %.

8. A foam control composition comprising:
   a fatty amine derived from a fatty acid component selected from a polyoxyethylene non-ionic fatty amine derived from a fatty acid, a polyoxypropylene non-ionic fatty amine derived from a fatty acid, or a polyoxyethylene-polyoxypropylene non-ionic fatty amine derived from a fatty acid, wherein the polyoxyethylene-polyoxypropylene non-ionic fatty amine derived from a fatty acid includes polyoxyethylene and polyoxypropylene units; and
   a quaternary ammonium surfactant,
   wherein a weight ratio of the fatty amine derived from a fatty acid component to the quaternary ammonium surfactant is from 2:1 to 30:1, and
   wherein the polyoxyethylene-polyoxypropylene non-ionic fatty amine derived from a fatty acid is present in the foam control composition in an amount of 10 wt % to 50 wt %.

9. The foam control composition of claim 8, wherein the fatty amine derived from a fatty acid component is an oleyl amine derivative.

10. The foam control composition of claim 8, wherein the weight ratio of the fatty amine derived from a fatty acid component to the quaternary ammonium surfactant is from 5:1 to 10:1.

11. The foam control composition of claim 8, wherein the quaternary ammonium surfactant is present in the foam control composition in an amount of from 1.67 wt % to 25 wt %.

* * * * *